United States Patent [19]

Pawelzik

[11] Patent Number: 4,540,023
[45] Date of Patent: Sep. 10, 1985

[54] SANITARY MIXING VALVE

[75] Inventor: Manfred Pawelzik, Soest, Fed. Rep. of Germany

[73] Assignee: Friedrich Grohe Armaturenfabrik GmbH & Co., Hemer, Fed. Rep. of Germany

[21] Appl. No.: 556,152

[22] Filed: Nov. 29, 1983

[30] Foreign Application Priority Data

Nov. 29, 1982 [DE] Fed. Rep. of Germany ....... 3244121

[51] Int. Cl.³ .............................................. F16K 11/06
[52] U.S. Cl. ........................... 137/625.17; 137/625.41
[58] Field of Search ............ 137/625.17, 625.4, 625.41

[56] References Cited

U.S. PATENT DOCUMENTS 3,433,264  3/1969  Parkison ........................ 137/625.17
3,533,436 10/1970  Parkison ......................... 137/625.4
3,965,936  6/1976  Lyon ............................... 137/625.4
4,362,186 12/1982  Parkison et al. ................. 137/625.4
4,375,225  3/1983  Andersson ..................... 137/625.17

FOREIGN PATENT DOCUMENTS 2829848  1/1980  Fed. Rep. of Germany .
2375526  7/1978  France .

Primary Examiner—Alan Cohan
Assistant Examiner—John A. Rivell
Attorney, Agent, or Firm—Karl F. Ross; Herbert Dubno

[57] ABSTRACT

A mixing valve of the type utilizing a fixed valve seat disk and a movable control disk is described. The axis of rotation of the control disk in the valve housing is offset in relation to the center of the valve seat disk towards the inlet passages. With this arrangement the pivot angle for setting the mixture ratio is increased.

4 Claims, 4 Drawing Figures

SANITARY MIXING VALVE

SPECIFICATION

This invention relates to a mixing valve for sanitary applications.

BACKGROUND OF THE INVENTION

Mixing valves for sanitary applications, such as described in publication DE-OS No. 15 50 050, include a valve seat disk having hot and cold water inlet apertures and a mixed water outlet aperture in a valve housing. A control disk is mounted on the valve seat disk and is provided with an overflow passage. The control disk is movable with the aid of a lever handle. The outlet flow rate is set by upward or downward movement of the lever handle and the mixture ratio is set by swivelling the handle. With these mixing valves, the control disk is only moved through relatively short distances or angular movements to change over from cold water to hot water. The movements of the control disk become even smaller if a certain mixture ratio of hot to cold water is to be obtained or altered slightly. The control lever connected to the control disk generally permits only slight adjustment so that accurate adjustment of the required mixed water temperature is difficult.

OBJECT OF THE INVENTION

It is an object of the invention to provide a mixing valve having a greater swivel angle for adjustment of the mixture ratio.

SUMMARY OF THE INVENTION

In a mixing valve in accordance with the principles of the invention the axis of rotation of the control disk in the valve housing is offset relative to the center of the valve seat disk. The offset is in the direction of the inlet passages.

By offsetting the axis of rotation of the control disk in relation to the center of the valve seat disk, the pivot angle for setting the mixture ratio can be significantly increased so that as a result more delicate setting of the mixture ratio with the handle is made possible. In particular, in the preferred mixed water temperature range from approximately 30° to 45° C., the so-called comfort range, adjustment of the mixture ratio is considerably improved and the temperature of the water supplied can be more easily set.

BRIEF DESCRIPTION OF THE DRAWING

The invention will be better understood from a reading of the following detailed description in conjunction with the drawing in which.

SPECIFIC DESCRIPTION

Figure 1:
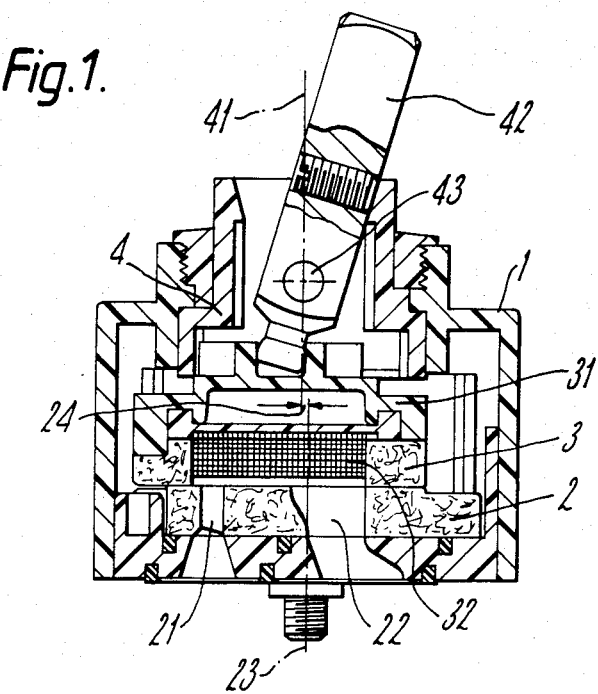
FIG. 1 is a longitudinal section through a mixing valve integral unit or valve cartridge as is used in sanitary pipe fittings.
Figure 2:
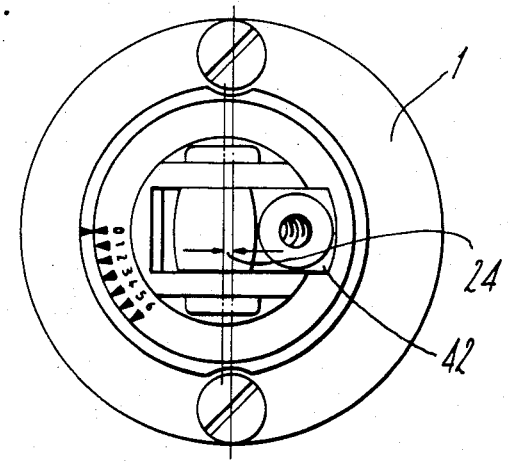
FIG. 2 is a top view of the mixing valve of FIG. 1.

The mixing valve is combined to form an integral unit in an approximately cylindrical valve housing 1 which can be used as a whole in (i.e. introduced as a unit into) a sanitary pipe fitting. A valve seat disk 2 of ceramic material is rigidly centrally located in the base area of valve housing 1. Valve seat disk 2 is provided with inlet passages 21 for hot and cold water and an outlet passage 22 for mixed water and is connected to corresponding passages in the sanitary pipe fitting which is not illustrated. A control disk 3 of ceramic material is located on valve seat disk 2 and includes a mixing and deflection passage 32. The contiguous faces of the two disks are provided with highly polished surfaces to ensure tight seating.

The control disk 3 is movably attached to a guide and cover plate 31 on its end face opposite the valve seat disk. The cover plate 31 seals the mixing and deflection passage 32. The guide and cover plate 31 is retained by a locating sleeve 4 rotatably mounted in valve housing 1. Positioned in sleeve 4 along its axis of rotation 41 is a double armed lever 42 which in addition to the common facility for rotation with locating bush 4 can be deflected about a trunnion 43 located at right angles to axis of rotation 41. The inner lever arm of lever 42 is connected to locating sleeve 4 so that as a result of deflection of a handle (not shown in the drawing) positioned on the outer section of lever 42, the guide and cover plate 31 can be moved with control disk 3 radially in relation to valve seat disk 2 so that flow regulation can be effected thereby. By swivelling the handle which is not shown and thus rotating locating member or sleeve 4 together with lever 42, the guide and cover plate 31 together with control disk 3 is correspondingly rotated in relation to valve seat disk 2 and thus determines the mixture ratio of the inflowing cold and hot water.

Figure 3:
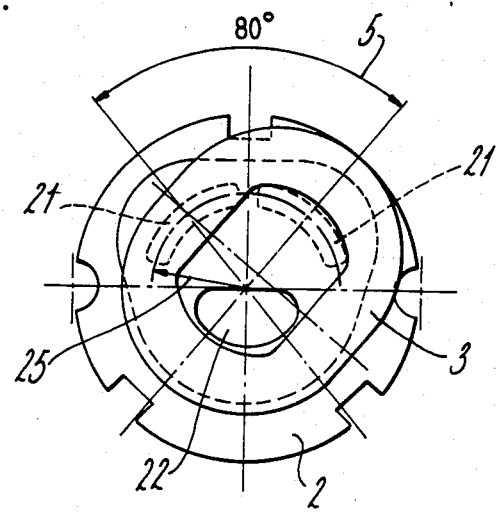
FIG. 3 illustrates the superimposed valve disks of FIG. 1 without axis offset.
Figure 4:
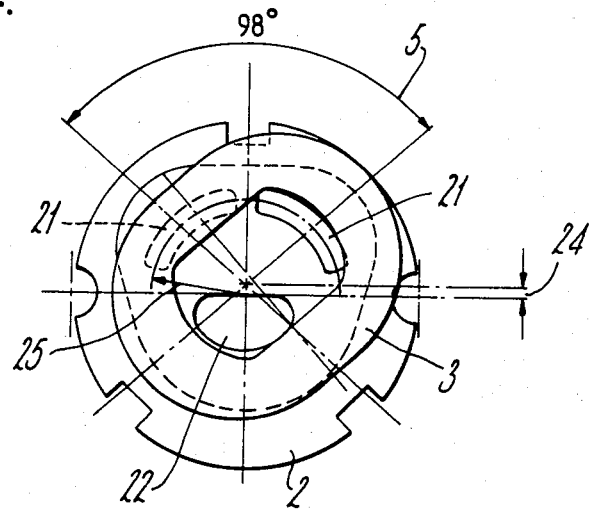
FIG. 4 illustrates the valve disks of FIG. 1 with offset of the axes.

The axis of rotation of locating sleeve 4 in valve housing 1 is offset in relation to the center axis 23 of valve seat disk 2. The inlet passages, as can be seen in FIG. 4 are arranged symmetrically as circular segments in one half of circular valve seat disk 2. The offset 24 is approximately 0.1×the mean radius 25 of the annulus on which inlet passages 21 are located. As can be seen from a comparison of FIGS. 3 and 4, the maximum angle of rotation 5 of the valve with coaxial center axes as in FIG. 3 is 80° but can be increased to 98° by providing an offset of the center axes as in FIG. 4. In keeping with the maximum angle of rotation 5, the extent of the so-called comfort range in which mixed water from 30° to 45° C. is produced is also increased so that a more delicate setting of the temperature of the mixed water is made possible.

What is claimed is:

1. A mixing valve comprising:
    a housing having an axis;
    a valve seat disk having inlet water passages and an outlet passage and fixed in said housing so as to be centered on said axis, said passages being spaced around said axis;
    a control disk disposed on said valve disk and having a mixing passage, said control disk being rotatable relative to said valve seat disk to control the mixture ratio and being radially displaceable relative to said valve seat disk to adjust the flow rate, said control disk being rotatable about an axis of rotation parallel to but offset by a predetermined amount from the center of said valve seat disk and said housing axis in the direction of said inlet passages;
    a rotatable member received in said housing and confined to rotation about said axis of rotation; and means on said member for rotating and radially displacing said control disk.

2. A mixing valve in accordance with claim 1, wherein said member comprises a locating sleeve for rotating said control disk having an axis of rotation offset relative to said housing axis; and a lever for radially displacing said control disk, said lever being pivotally movable in said locating sleeve.

3. A mixing valve in accordance with claim 1 wherein said inlet passages are in the form of annular segments and are symmetrically positioned in one half of said valve seat disk; and said offset of the axis of rotation is approximately $0.1 \times$ the mean radius of said symmetrically positioned annular segments.

4. A mixing valve in accordance with claim 2, wherein said inlet passages are in the form of annular segments and are symmetrically positioned in one half of said valve seat disk; and said offset of the axis of rotation is approximately $0.1 \times$ the mean radius of said symmetrically positioned annular segments.

* * * * *